3,840,651
SODIUM CHLORIDE MELT REFINING PROCESS
Donald T. Ireland, Minnetonka, Minn., assignor to Cargill, Incorporated, Minneapolis, Minn.
No Drawing. Filed Sept. 6, 1972, Ser. No. 286,672
Int. Cl. C01d 3/14, 3/16, 3/20
U.S. Cl. 423—499                              12 Claims

ABSTRACT OF THE DISCLOSURE

A process for melt refining sodium chloride to provide a high purity salt product which is substantially free of ionic calcium, magnesium and sulfate impurities. In the process, an alkali precipitation agent is introduced into a sodium chloride melt to precipitate calcium and magnesium impurities and the melt is contacted with elemental carbon to remove sulfate impurity. The precipitated impurities and any remaining carbon are removed from the melt, and the purified melt is cooled and solidified.

---

The present invention is directed to a process for melt refining sodium chloride, and more particularly is directed to a process for melt refining rock salt to remove sulfate impurities and calcium and magnesium impurities from the salt, and to provide a substantially 100 percent purity salt product.

Calcium and magnesium sulfates are generally the principal impurities in rock salt, and these impurities may be quite objectionable in various industrial processes such as in the textile and food processing industries where large quantities of salt of at least about 99.9 percent purity are consumed. The high purity salt required for such uses is usually made by dissolving rock salt to provide a brine, and chemically treating the brine to remove calcium and magnesium impurities. A highly purified salt is then crystallized from the chemically treated brine. The brine purification and crystallization methods and equipment for carrying out these methods are highly developed, and have almost necessarily become quite sophisticated and complex.

However, the brine purification and crystallization methods inherently have relatively high heat energy requirements because they require evaporation of large quantities of water. An alternative purification method which would be capable of reliably providing high purity salt, but which would not have such inherently high heat energy requirements, would be very desirable.

In this regard, various processes, dating back at least to that described in the 1892 U.S. Pat. No. 475,576 to Lawton et al., have been proposed for purification of salt, in a molten condition rather than in solution. Melting of salt requires substantially less heat energy than evaporation and crystallization of a brine solution. In this regard, the amount of heat energy required to heat a given amount of rock salt up to its melting point, and to melt the salt, is only about one fifth of the amount of heat enregy required to heat and vaporize enough water from a saturated salt brine to crystallize an equal amount of salt. However, none of these processes has been reliably effective for providing high purity salt of the quality required for many industrial and other uses, and solution purification with its inherent disadvantages and evolved process and equipment complexity continues to be the dominant manufacturing method.

Accordingly, it is an object of the present invention to provide an improved method for the melt refining of salt.

It is another object to provide a melt refining process for refining rock salt to provide a high purity salt product.

It is a further object to provide a process for economically removing calcium, magnesium, and sulfate impurities from salt by means of a melt refining process.

Generally, the present invention is directed to a process for melt refining rock salt to provide a high purity salt product which is substantially free of ionic calcium, magnesium and sulfate impurities. In the process, the rock salt to be purified is heated above its melting temperature to provide a salt melt, and the salt melt is subjected to two different types of purification treatments, which in combination effect the removal from the melt, respectively, of ionic calcium and magnesium impurities and ionic sulfate impurity. These two types of purification treatment may be carried out either sequentially or concurrently.

In order to separate the ionic calcium and magnesium impurities from the melt, an alkali precipitation agent is introduced into the melt. The alkali precipitation agent may be introduced into the melt either by adding it directly to the melt, or by mixing it with or otherwise adding it to the salt before it is melted. The alkali precipitation agent causes the ionic calcium and magnesium impurities to be precipitated from the salt melt. The precipitated calcium and magnesium impurities are subsequently readily separated from the salt melt, for example by sedimentation, centrifugation and/or filtration, to provide a salt melt which is substantially free of ionic calcium and magnesium purities. The alkali precipitation agent does not, however, effect the removal of sulfate impurity from the salt melt and another type of treatment is required for this purpose.

In accordance with the present invention, sulfate impurity is removed from the salt melt by contacting the salt melt with a source of elemental carbon, and maintaining the salt melt in contact with elemental carbon for a predetermined time to effect the desired level of sulfate removal. Normally it will be desired to achieve substantially complete removal of sulfate impurity, and the salt melt will be maintained in contact with the carbon until such a high level of sulfate purity is achieved. After the desired level of sulfate removal has been obtained, any remaining carbon is removed from the salt melt.

The precipitation of the calcium and magnesium, and the removal of sulfate impurity, may be carried out sequentially with either type of purification being carried out first, or they may be carried out concurrently. If concurrent purification in a batch process is desired, for example, the rock salt charge may be thoroughly mixed with the alkali precipitation agent and the elemental carbon prior to melting. Upon melting the mixture, the calcium and magnesium impurities will be precipitated in the rock salt melt by means of the precipitation agent, and the melt will be contacted by the elemental carbon which was added in the charge. Completely concurrent operation has the advantage that the removal of the precipitated calcium and magnesium impurities, and the removal of any remaining carbon from the melt may be carried out at the same time. In this regard, even if it is desired to add the alkali precipitation agent at a different time than the elemental carbon, the removal of the precipitate and the carbon may still be carried out at the same time.

After the calcium and magnesium precipitation and sulfate removal purification steps, the salt melt is cooled and solidified to provide a high purity, solid salt product.

More specifically, in the process the impure, raw material rock salt is heated to a temperature above its melting temperature of about 801° C. in order to provide a salt melt in which the purification reactions are carried out. Preferably, the rock salt is heated to a temperature of between about 825° C. and about 900° C. A temperature of about 850° C. has been found to be an effective temperature for the process.

If the refining process is to be carried out in a batch operation, the rock salt will generally be melted in a furnace having as its melting zone a crucible or other container which is relatively inert to the salt melt so that impurities are not introduced into the salt from the container. The process may also be adapted for continuous-type operations. Crucibles and conduits fabricated from porcelain clay, as well as other materials which are relatively inert to the corrosive action of the salt melt, are suitable for handling and confining the melt. Furnaces such as those commercially available for aluminum refining are suitable for use in the present invention to provide the salt melt.

In accordance with the present invention, the ionic calcium and magnesium impurities are removed by introducing an alkali precipitation agent into the melt to precipitate these impurities. The alkali precipitation agent is advantageously mixed with the rock salt prior to melting, but also may be added to the molten salt mass after it is melted.

The alkali precipitation agent may be an alkali metal hydroxide, carbonate, silicate or phosphate. Preferred are sodium and potassium hydroxides, carbonates, and silicates. Sodium hydroxide is particularly effective in the process, and sodium carbonate and sodium silicate are particularly preferred because of the effectiveness of their action and their favorable economic availability. Sodium compounds have the additional advantage of not introducing a foreign cation into the sodium chloride melt, although other alkali metal compounds may be utilized if desired.

It has been found to be important for the removal of calcium and magnesium impurities from the raw material salt that the precipitation agent be an alkali metal compound. In this regard, other materials such as alkaline earth carbonates and oxides may improve the appearance of rock salt by removing various coloring impurities from a salt melt to provide a salt which appears white and is non-hydroscopic. However, alkaline earth compounds are not effective for removal of ionic calcium and magnesium impurities.

The quantity of alkali precipitation agent employed will depend on the amount of impurities in the raw material salt. Generally, a stoichiometric amount, or a slight stoichiometric excess, of the alkali precipitation agent with respect to the total ionic calcium and magnesium impurities, should be used to insure substantially complete removal of these impurities. Ordinarily, between about 0.5 and about 2.5 percent by weight based on the weight of the salt, of the alkali precipitation agent are added. For ordinary grades of rock salt, which may contain from about 0.8 to about 5 percent by weight calcium impurity, and from about 0.001 to about 0.5 percent by weight magnesium impurities, calculated as calcium sulfate and magnesium sulfate, respectively, one to three percent by weight of the alkali precipitation agent has been found to be satisfactory.

It is believed that the reaction which occurs in the molten salt causes the precipitation of the magnesium or calcium impurity as an oxide or a salt, such as a silicate or phosphate, which is insoluble in the molten sodium chloride. For example, considering sodium hydroxide, sodium silicate and sodium carbonate as the precipitating agents, it is believed that the reactions which occur during purification may be represented as follows for calcium impurity:

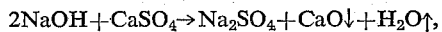

or

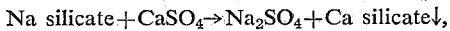

or

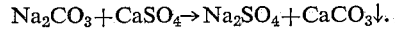

In the latter case, as both sodium carbonate and calcium carbonate decompose at the high temperatures of the salt melt, the calcium impurity would be precipitated as calcium oxide. Magnesium impurities are similarly caused to precipitate from the salt melt by the alkali precipitation agent. Of course, it will be realized that the calcium and magnesium sulfate are not necessarily present as separate chemical entities in the ionic salt melt. In this regard it will be realized that ionic calcium and magnesium impurities nominally associated with other anions, such as chloride and bromide, will also be precipitated, as will ionic calcium and magnesium impurities remaining in the melt after the sulfate removal, when sulfate removal is carried out before the calcium and magnesium impurity precipitation. After the calcium and magnesium impurities have been caused to precpitate from the melt by the action of the alkali precipitation agent, the precipitate is separated from the melt. The precipitation reaction itself is believed to be quite rapid in the salt melt. However, the precipitate may require time to agglomerate and/or settle so that it may be most effectively separated from the melt.

Decantation or pumping of the clarified supernatant salt melt from a settled precipitate may be used as a method of separating the precipitated impurities from the melt, although in smaller batches, floating, unsettled, or unagglomerated impurities may hamper decantation or cause some inconsistency in purity results. In this regard, filtering or centrifuging the precipitated impurities from the melt may be used to achieve more effective separation and removal of the precipitated impurities from the melt.

While the alkali precipitation agent effects the precipitation of calcium and magnesium impurities from the salt melt, it does not effect the removal of sulfate impurities from the melt. In order to remove the sulfate impurity, the salt melt is contacted with elemental carbon. Examples of suitable elemental carbon sources, are coal, charcoal, coke, graphite, and carbon black. Coal is particularly preferred because of its economical availability and the effectiveness of its action.

When the molten salt is contacted with the elemental carbon, it is believed that the ionic sulfate($SO_4^=$) impurity is reduced by reaction with the carbon to provide sulfur dioxide, and carbon dioxide or carbon monoxide, which are driven off and escape from the melt as gases.

The elemental carbon with which the melt is contacted should be finely subdivided and should have a high surface area to weight ratio. In this regard, the elemental carbon should have a particle size of less than about 0.2 inches or be capable of passing through a size number 4 sieve of the U.S. Sieve series. Preferably, the elemental carbon will have a particle size of less than about 0.08 inchees or be capable of passing through a size number 10 sieve.

The sulfate impurity is progressively removed from the melt as the melt is maintained in contact with the carbon, and contact is maintained for a period of time sufficient to effect the desired level of sulfate removal. The period of time for substantially complete sulfate removal depends upon a number of factors including the amount of sulfate impurity originally present, the reaction temperature, and the amount, type, particle size and surface area of the elemental carbon used. For example, two percent by weight, based on the weight of the salt, of powdered coal having a particle size of about 0.2 inches (or capable of passing through a size number 4 sieve) when mixed with rock salt containing about 1.5 percent by weight sulfate impurity (calculated as calcium sulfate) and heated to 850° C., will remove substantially all sulfate in about 16 hours. Twenty percent by weight of the number 4 sieve powdered coal in the salt melt under the same conditions will remove substantially all of the sulfate impurity in 1½ to 2 hours. Moreover, the sulfate-purification with elemental carbon may be catalyzed to increase the speed of the sulfate-purification action. For example, the use of a nickel catalyst (Girdler G–49B nickel catalyst) in concentrations of between about 0.5 and about 0.25 percent by weight based on the weight of the salt has been found to approximately double the rate of sulfate reduction under such conditions.

A black discoloration and sulfide ions may be produced in the salt melt by the elemental carbon, and this may be removed by introducing air or oxygen into the salt melt. Sparging the air or oxygen into the salt melt will remove the remaining carbon and any sulfide impurity or discoloration.

After the salt melt has been maintained in contact with the elemental carbon for a period of time sufficient to effect removal of the sulfate impurities, any remaining carbon is removed from the salt melt. For batch processes, the carbon may generally be removed by permitting it to float to the surface and draining, decanting or pumping off the clarified purified salt melt. Filtration and/or centrifugation may also be useful in this regard. The precipitated calcium and magnesium impurities and the carbon may be removed from the melt together, in the same process step, and ordinarily the procedure would be followed as a matter of process economy. The carbonaceous material may be burned from the melt by injecting oxygen or air into the body of the molten salt mass such as by using a lance. Generally, in order to be most effective, the air or oxygen should be distributed through the molten mass as it is introduced thereinto, such as by a suitable sparging head located at the bottom of the salt melt. Ash components of the carbonaceous material, if any, may conveniently be removed by filtration or centrifugation processes.

For more continuous operation, the salt melt may be passed through a suitable proportioned column packed with an elemental carbon source such as coal. The use of such a column permits a high rate of sulfate-purification by providing a sulfate purification zone having high carbon to salt-melt ratios. The salt melt may be continuously or intermittently passed through such a column of suitable length at a flow rate such that the salt melt is maintained in contact with the carbon in the column for a period of time sufficient to effect removal of substantially all of the sulfate impurity. Since the carbon is confined to the zone of the column, as the salt melt passes from the column the carbon in the column is effectively separated and removed from the salt melt after the sulfate-purification. In addition, the molten salt may be introduced at the top of a column and withdrawn at the bottom of the column to further insure that the carbonaceous column material will be confined to the column zone. As noted hereinabove, the carbonaceous material may be removed from the salt melt by introducing oxygen or air into the melt. The carbonaceous material is thereby converted to its gaseous combustion products and thereby removed. It is advantageous to combine the air or oxygen introduction step with the mechanical separation steps such as clarification, filtration and centrifugation, so that the air or oxygen introduction step follows the mechanical separation step to remove any traces of sulfide or carbonaceous impurities which may remain in the melt.

After the sulfate, the calcium and magnesium impurities, and any remaining carbon have been separated or removed from the melt, the melt is cooled and solidified to provide a high purity, solid salt product. In this regard, the purified salt melt lends itself to the production of various forms of solid salt products such as granules, flakes, and pellets.

The following Examples illustrate various aspects of the present invention.

EXAMPLE 1

A rock salt sample which contains 1.55 percent by weight calcium impurity expressed as calcium sulfate is mixed in a series of four runs with various weight percentage amounts, based on the weight of the rock salt, of various alkali precipitation agents. The salt-precipitation agent mixtures are placed in porcelain crucibles, and are heated to form a melt at a temperature of 850° C. A calcium impurity precipitate forms in each run almost immediately as the salt is melted, and is permitted to agglomerate and settle for about 2 hours. After the precipitates have settled, they are removed from the clarified melts by carefully decanting the melts from the settled impurity precipitates. The decanted salt melt of each run is cooled, and analyzed for calcium impurity, expressed as calcium sulfate, in order to determine the percent of the calcium impurity removed from the melt by the action of the alkali precipitation agent.

The results of these runs are as follows:

| Run | Alkali precipitation agent | Percent of precipitation agent mixed with salt | Percent calcium impurity removed |
|---|---|---|---|
| 1 | Sodium carbonate | 3.0 | 99.6 |
| 2 | do | 1.5 | 88 |
| 3 | Sodium meta silicate | 2.0 | 97 |
| 4 | Trisodium phosphate | 2.0 | 72 |

It should be noted that magnesium impurity present in the rock salt is also precipitated by the alkali precipitation agents in these runs.

Since the sulfate impurity originally present in the rock salt remains in the melt as sodium sulfate, a second series of runs is then carried out which is substantially identical to the first four runs except that after the salt melts are decanted from the settled impuriy precipiates, 20 percent by weight based on the weight of the decanted salt melt of powdered coal having a particle size of about 0.2 inches is added to each of the decanted salt melts, and the melts (in crucibles) are maintained in contact with the powdered coal at a temperature of 850° C. for about six hours. A short air blast of about 30 minutes duration is then directed into the salt melts in order to remove their black discoloration and sulfide ion. The salt melts are then permitted to settle for 2 hours at a temperature of 850° C., and then are decanted from the coal ash which has settled to the bottom of the crucibles. The decanted salt melts are cooled, and analyzed gravimetrically for sulfate with barium chloride. It is found that this second series of runs, in addition to having the degree of calcium and magnesium impurity removal indicated by their respective counterpart runs 1–4, are also substantially free of sulfate impurity.

EXAMPLE 2

Rock salt fines from a commercial Gulf of Mississippi mine at Belle Isle on the Louisiana coast are mixed with various additives in a series of eight runs, in order to determine the effect of these additives as precipitating agents for calcium and magnesium impurities. The mixtures of the rock salt fines and the various additives are placed in separate crucibles and are heated to a temperature of 850° C. to provide salt melts. The melts are allowed to settle for 2 hours and are subsequently decanted from any insoluble sediment or precipitate at the bottoms of the crucibles. Sulfate impurity present in the rock salt fines remains in the salt melt.

After the salt melts have been settled and decanted, they are cooled, and analyzed for calcium and magnesium impurities, which are expressed in terms of percent calcium sulfate. The effect of these additives on salt color is also noted. The results of these runs are as follows:

| Run | Additive | Percent of additive based on weight of salt | Percent calcium sulfate impurity | Color |
|---|---|---|---|---|
| 1 | None (control run) | 0 | 1.2 | Light brown. |
| 2 | Lime (CaO) | 3 | 1.4 | White. |
| 3 | Calcium silicate (CaSiO₃) | 3 | 0.9 | Light brown. |
| 4 | Magnesium carbonate | 3 | 1.1 | White. |
| 5 | Magnesium silicate (MgSiO₃) | 3 | 1.2 | Light brown. |
| 6 | Calcium carbonate | 3 | 1.4 | Light blue. |
| 7 | Hydrated lime [Ca(OH)₂] | 3 | 1.2 | Do. |
| 8 | Sodium hydroxide | 3 | 0.0 | White. |

This example demonstrates the ineffectiveness of alkaline earth compounds for removing calcium and magnesium impurities. While various of the alkaline earth additives used in the example are effective for improving the color of the raw material rock salt, only the alkali precipitation agent (NaOH, run 8) demonstrates effective removal of the calcium and magnesium impurities.

EXAMPLE 3

Belle Isle rock salt fines which contain two percent sulfate impurity expressed as percent by weight calcium sulfate, are thoroughly mixed in a number of separate runs with various sources of elemental carbon. The carbon-rock salt mixtures are placed in suitably inert crucibles, are heated to 850° C., and are maintained at that temperature for a period of time determined by experimentation to result in substantially complete removal of the sulfate impurity. An air stream is then directed into the salt melts for a period of about 30 minutes in order to remove their black discoloration and sulfide ion, followed by a 2 hour settling period. After the settling period, the salt melts are decanted from the settled elemental carbon, and are analyzed gravimetrically for sulfate with BaCl₂. Each of the runs is found to be substantially free of sulfate impurity, having a sulfate concentration of less than five parts per million by weight, to the limit of the sensitivity of the gravimetric sulfate test using barium chloride. The concentration of calcium and magnesium impurities is not substantially reduced in the salt melt by the high temperature treatment of the rock salt with elemental carbon.

The parameters of the various runs are as follows:

| Run | Carbon source | Weight percent carbon based on rock salt | Carbon particle size (U.S. sieve size) | Duration of treatment: 850° C. determined to achieve substantially complete sulfate removal |
|---|---|---|---|---|
| 1 | Charcoal | 40 | 50 mesh | 6-8 hours. |
| 1a | Charcoal plus nickel catalyst | 40 | do | 3 hours. |
| 2 | Charcoal | | do | 8 hours. |
| 3 | Coal | 2 | 4 mesh | 16 hours. |
| 4 | do | 20 | do | 1½-2 hours. |
| 5 | Coke | | do | 16 hours. |

While the elemental carbon is found to be effective to remove the sulfate impurity and is believed to function as a reducing agent, it is found that bubbling either natural gas or hydrogen into a salt melt at 850° C. for 6 hours does not remove the sulfate impurity of the rock salt.

Addition of 2 percent by weight, based on the weight of the rock salt, of an alkali precipitation agent such as sodium hydroxide or sodium carbonate, will effect precipitation of calcium and magnesium impurities remaining in the salt melts after treatment with the elemental carbon. Removal of the precipitate and cooling of the melts provide solid salt products which are substantially free of ionic calcium, magnesium and sulfate impurities.

EXAMPLE 4

About 50 grams of rock salt fines are thoroughly mixed with two percent by weight sodium hydroxide, and ten percent by weight powdered coal having a particle size of about 4 mesh, based on the weight of the rock salt. The rock salt contains about 2.0 percent by weight calcium sulfate, 0.002 percent by weight magnesium sulfate and smaller amounts of other magnesium and calcium salts.

The salt-carbon-alkali mixture is placed in an inert clay crucible and heated to 850° C., and is maintained at that temperature for 6 hours. An air blast of a strength slightly less than that sufficient to cause splattering of the salt melt is directed into the melt for a period of about ½ hour to remove the dark discoloration and sulfide ion which has appeared. The salt melt is then maintained quiescent at a temperature of 850° C. for a 2 hour settling period, and is then decanted from the resulting carbon ash and the precipitate of calcium and magnesium impurities which have settled to the bottom of the crucible. The purified salt, after cooling and solidification, is white in color, and is substantially free of calcium, magnesium and sulfate impurities.

It will be seen from the foregoing that a process for melt refining sodium chloride has been provided which in its basic form is relatively simple, uses relatively inexpensive raw materials, and is effective for providing a highly purified salt product. The process is particularly applicable for the industrial refining of rock salt and advantageously uses rock salt fines as a raw material, which otherwise generally have limited usefulness because they are difficult to handle. Generally, rock salt purified by preferred embodiments of the present process will be at least about 99.9 percent and preferably greater than about 99.99 percent sodium chloride.

In view of the present disclosure, various modifications of the embodiments of the process disclosed herein will become apparent to those skilled in the art, and such modifications are intended to be within the scope of the invention.

Various of the features of the invention are set forth in the following claims.

What is claimed is:

1. A process for melt refining sodium chloride to provide a high purity salt product which is substantially free of calcium, magnesium, and sulfate impurities, comprising carrying out in combination the steps of
   (a) heating the sodium chloride above its melting temperature to provide a salt melt,
   (b) introducing into said melt a sufficient quantity of an alkali precipitation agent selected from the group consisting of alkali hydroxides, carbonates, silicates and phosphates, to precipitate calcium and magnesium impurities in said melt,
   (c) removing precipitated calcium and magnesium impurities from said melt,
   (d) contacting said melt with elemental carbon to remove sulfate impurity from said melt,
   (e) maintaining said salt melt in contact with said carbon for a predetermined time to effect the desired level of sulfate removal,
   (f) removing any remaining carbon from the salt melt after the desired level of sulfate removal has been obtained, and
   (g) subsequently cooling and solidifying the salt melt to provide a high purity, solid salt product.

2. A process in accordance with Claim 1 wherein between about 0.5 percent by weight and about 3.0 percent by weight of said alkali precipitation agent, based on the weight of the salt, is introduced into the melt.

3. A process in accordance with Claim 2 wherein said alkali precipitation agent is introduced into the melt by mixing with the salt prior to melting.

4. A process in accordance with Claim 2 wherein said alkali precipitation agent is added directly to the salt melt.

5. A process in accordance with Claim 2 wherein said alkali precipitation agent is selected from the group consisting of sodium hydroxide, sodium carbonate and sodium silicate.

6. A process in accordance with Claim 5 wherein a flow of air or oxygen is directed into the salt melt to remove dark discoloration and sulfide ion in the melt caused by contact with said elemental carbon.

7. A process in accordance with Claim 6 wherein said elemental carbon has a particle size of less than about 4 mesh.

8. A process in accordance with Claim 7 wherein said elemental carbon is selected from the group consisting of coal, charcoal, and coke.

9. A process in accordance with Claim 8 wherein the melt is maintained in contact with the carbon for a period of time sufficient to effect substantially complete removal of sulfate impurity from the melt.

10. A process in accordance with Claim 9 wherein said alkali precipitation agent and said carbon are concurrently introduced into the melt, and wherein said precipitated calcium and magnesium impurities and said remaining carbon are concurrently removed from the salt melt.

11. A process in accordance with Claim 1 wherein said alkali precipitation agent is employed in at least a stoichiometric amount with respect to the total ionic calcium and magnesium impurities of the sodium chloride to be refined.

12. A process in accordance with Claim 11 wherein said sodium chloride is rock salt, and wherein said high purity salt product is at least about 99.9 percent sodium chloride.

References Cited
UNITED STATES PATENTS

| Number | Date | Name | Class |
|---|---|---|---|
| 33,424 | 10/1861 | Barker et al. | 423—499 X |
| Re. 1,290 | 3/1862 | Spencer | 423—499 X |
| 41,980 | 3/1864 | Duffield | 423—499 X |
| 237,600 | 2/1881 | Rice | 423—499 X |
| 304,341 | 9/1884 | Mebus | 423—499 X |
| 436,633 | 9/1890 | Monsanto | 423—499 X |
| 475,576 | 5/1892 | Lawton | 423—179 |
| 792,632 | 6/1905 | Tee | 423—499 X |
| 2,977,189 | 3/1961 | Ladenburg et al. | 423—499 X |
| 3,512,928 | 5/1970 | Lyons et al. | 423—497 X |
| 3,591,332 | 7/1971 | George et al. | 423—497 X |

EDWARD STERN, Primary Examiner

U.S. Cl. X.R.

423—179, 184